United States Patent
Pfeffer et al.

(10) Patent No.: US 12,120,414 B2
(45) Date of Patent: Oct. 15, 2024

(54) ADAPTIVE FLASH WITH PULSE WIDTH MODULATION

(71) Applicant: Lumileds LLC, San Jose, CA (US)

(72) Inventors: Nicola Bettina Pfeffer, Eindhoven (NL); Arjen Gerben Van der Sijde, Eindhoven (NL); Pieter Johannes Quintus van Voorst Vader, Eindhoven (NL); Marcus Hendrikus Adrianus van Steen, Eindhoven (NL); Ronald Johannes Bonne, Plainfield, IL (US)

(73) Assignee: Lumileds LLC, San Jose, CA (US)

( * ) Notice: Subject to any disclaimer, the term of this patent is extended or adjusted under 35 U.S.C. 154(b) by 171 days.

(21) Appl. No.: 17/978,678

(22) Filed: Nov. 1, 2022

(65) Prior Publication Data

US 2023/0137928 A1    May 4, 2023

Related U.S. Application Data

(60) Provisional application No. 63/274,708, filed on Nov. 2, 2021.

(51) Int. Cl.
H04N 23/56    (2023.01)
H04N 23/667    (2023.01)
H04N 23/74    (2023.01)

(52) U.S. Cl.
CPC ........... *H04N 23/56* (2023.01); *H04N 23/667* (2023.01); *H04N 23/74* (2023.01)

(58) Field of Classification Search
CPC ...... H04N 23/56; H04N 23/667; H04N 23/74; H04N 23/71
See application file for complete search history.

(56) References Cited

U.S. PATENT DOCUMENTS 7,991,281 B1 *    8/2011    Majewicz ............... H05B 45/14
                                                                  355/68
9,313,855 B1 *    4/2016    Sivertsen ............... H05B 47/11
                        (Continued)

FOREIGN PATENT DOCUMENTS

JP    2013539183 A    10/2013
KR    20150116945 A    10/2015
                (Continued)

OTHER PUBLICATIONS

"International Application Serial No. PCT/US2022/048587, International Search Report mailed Mar. 10, 2023", 4 pgs.
(Continued)

*Primary Examiner* — Lin Ye
*Assistant Examiner* — Tuan H Le
(74) *Attorney, Agent, or Firm* — Schwegman, Lundberg & Woessner, P.A.

(57) ABSTRACT

A sensor can sense time-varying ambient light that is present in a scene to produce an ambient light signal. A processor can determine an ambient light frequency and an ambient light phase of the ambient light signal. Light-emitting diodes (LEDs) of an LED array can be electrically powered with pulse-width modulation (PWM) electrical signals having a same amplitude to produce illumination. Each LED can illuminate a respective region of the scene. Each PWM electrical signal can have a respective duty cycle that corresponds to a specified illumination intensity in a respective region of the scene. The PWM electrical signals can have a same PWM frequency that is an integral multiple of the ambient light frequency. Each PWM electrical signal can have a respective PWM phase that is synchronized to the ambient light phase. A lens can direct the illumination toward the scene to illuminate the scene.

20 Claims, 4 Drawing Sheets

(56) References Cited

U.S. PATENT DOCUMENTS

| | | |
|---|---|---|
| 2012/0049745 A1 | 3/2012 | Li et al. |
| 2012/0169239 A1* | 7/2012 | Chen ...................... H05B 47/11 |
| | | 315/152 |
| 2012/0262571 A1* | 10/2012 | Wang ..................... H04N 23/10 |
| | | 348/135 |
| 2016/0150165 A1* | 5/2016 | Grauer ................. H04N 25/622 |
| | | 348/308 |
| 2017/0086277 A1 | 3/2017 | Kim |
| 2018/0041681 A1* | 2/2018 | Pope ....................... H04N 23/72 |
| 2020/0022239 A1* | 1/2020 | Hung ..................... H05B 45/14 |
| 2020/0375005 A1* | 11/2020 | Gu ............................ F21K 9/62 |

FOREIGN PATENT DOCUMENTS

| | | |
|---|---|---|
| KR | 20200098660 A | 8/2020 |
| WO | 2019126583 A1 | 6/2019 |

OTHER PUBLICATIONS

"International Application Serial No. PCT/US2022/048587, Written Opinion mailed Mar. 10, 2023", 4 pgs.

\* cited by examiner

ADAPTIVE FLASH WITH PULSE WIDTH MODULATION

CROSS-REFERENCE TO RELATED APPLICATION

This application claims the benefit of U.S. Provisional Application No. 63/274,708, filed on Nov. 2, 2021, the entirety of which is hereby incorporated by reference herein.

FIELD OF THE DISCLOSURE

The present disclosure relates to an illumination system, such as for a camera.

BACKGROUND OF THE DISCLOSURE

There is ongoing effort to improve illumination systems, such as for cameras.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
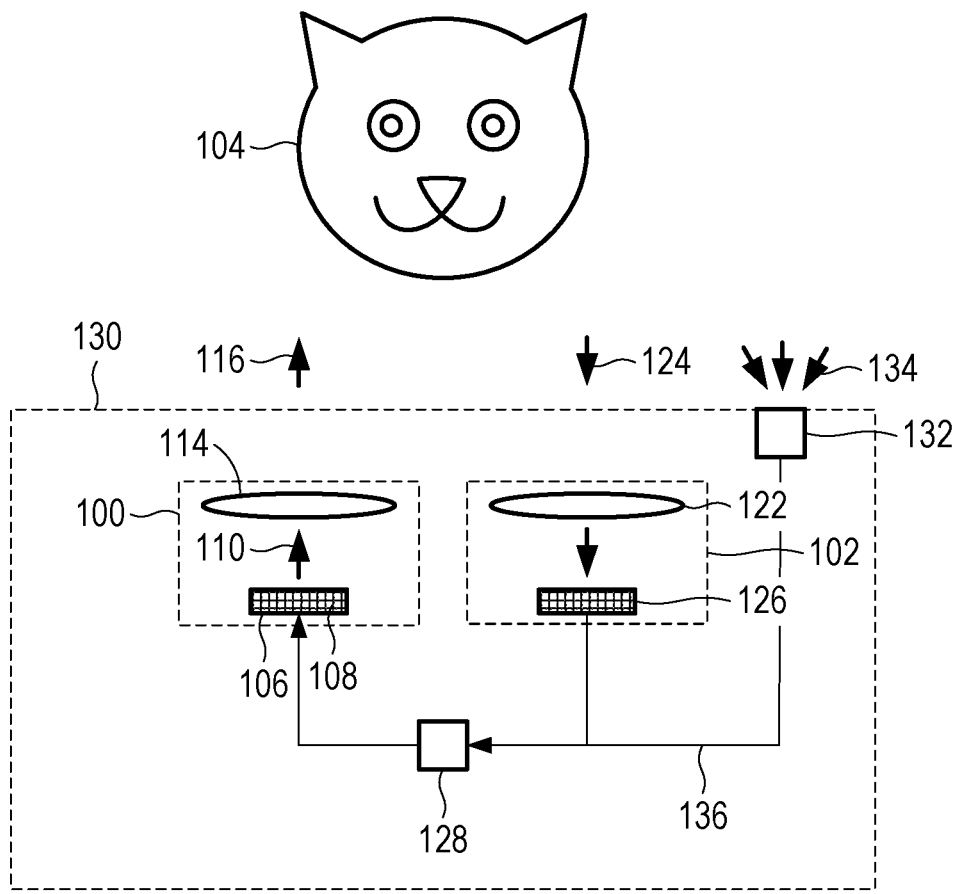
FIG. 1 shows a side view of an example of an imaging system, in accordance with some examples.

In an illumination system that uses a segmented light-emitting diode (LED) array as a light source, the LEDs of the array can be powered independently to direct illumination having a specified profile to a scene. For example, in a camera flash, an LED corresponding to an edge of a field of view can be powered to be brighter than an LED at a center of the field of view. As another example, in a camera flash, an LED corresponding to a relatively distant object can be powered to be brighter than an LED corresponding to a relatively close object. As still another example, in a vehicle headlight, LEDs can be powered such that the headlight avoids directing illumination into oncoming vehicles. Other suitable examples can also be used.

It can be challenging to supply power to the LEDs in a segmented LED array in a manner that provides uniform illumination or a specified illumination profile. It can be additionally challenging to supply power to microLEDs in a segmented LED array (e.g., LEDs having emission surfaces that occupy a relatively small surface area compared to a full surface area of the LED array) in a manner that provides uniform illumination or a specified illumination profile.

For example, an illumination system that uses a direct current (DC) driver, which can supply a DC voltage or DC current (or a slowly-varying voltage or a slowly-varying current) of a suitable amplitude to produce a desired brightness from a particular LED of the segmented LED array, can cause color variation across an area of the LED array. For example, a leftmost edge of an LED can have a relatively high targeted illuminance (e.g., such that the LEDs at the leftmost edge of the LED array receive a relatively high current), and a rightmost edge can have a relatively low targeted illuminance (e.g., such that the LEDs at the rightmost edge of the LED array receive a relatively low current). Such a current imbalance can cause color shading. For example, illumination at the scene can show a relatively blue tint at an edge corresponding to the leftmost edge of the LED, and a relatively red tint at an edge corresponding to the rightmost edge of the LED. Such color shading is an example of a potential drawback of using a DC voltage or a DC current of varying amplitude to drive a segmented LED array.

In addition, because LEDs can have an efficiency (e.g., a ratio of optical output power divided by applied power, as a function of applied current) that peaks at a specified value of applied current and decreases at current values away from the specified value, varying the DC voltage or DC current to drive the segmented LED array can cause the LEDs to operate at conditions away from the peak efficiency.

To overcome the drawback of color tinting in a segmented LED array caused by varying DC voltage or DC current levels, the illumination system can electrically power the segmented LED array with pulse width modulation (PWM). In PWM, a current or voltage of a constant (or slowly-varying) amplitude is switched on and off rapidly, with a switching period (or an inverse of a switching rate) that is less than a response time of a detector, such as a sensor in a camera or the human eye. The detector performs a time-average of the sensed intensity, such that the perceived intensity is proportional to a duty cycle of the switching (e.g., a value between 0% and 100% that represents a fraction of a particular duration or time interval during which a particular LED is powered). The voltage or current level can be a maximum current level that an LED of the segmented LED array can safely withstand, or another suitable value.

A drawback of an imaging system, which can optionally use PWM to drive a segmented LED array to provide illumination, is that variations in illumination (for example, ambient illumination, such as room lights) can produce spurious banding in images taken by a sensor having a rolling shutter, such as a complementary metal oxide semiconductor (CMOS) camera. In a rolling shutter, the exposure windows of the pixels are staggered in time, rather than simultaneous.

To overcome the drawback of spurious banding caused by a rolling shutter of the sensor, an imaging system can tune an integration time of the sensor. For example, the imaging system can tune the integration time to be close to (e.g., within 1% of, 2% of, 5% of, 10% of, or within another percentage of) the time at which a maximum of the varying (ambient) illumination occurs, so that the rolling shutter of the sensor detects only relatively small changes in the ambient illumination. As another example, for an imaging system that includes illumination from a segmented LED array that is driven with a PWM signal, the imaging system can tune the integration time to equal or be close to an integral multiple of the PWM period. For example, for an illuminator for a camera system, in which the number of LEDs in the segmented LED array can be fewer than or equal to 100 (although larger numbers of LEDs can also be used), the sensor can have an integration frequency (e.g., an inverse of integration time) of up to 1000 Hz or greater. As another example, for an illuminator for a vehicular illumination system, such as an automobile headlight, the number of LEDs in the segmented LED array can be as many as 20,000 or greater, and the sensor can have an integration frequency of about 500 Hz to 600 Hz, although frequency values outside this range can also be used.

To accomplish the tuning, the imaging system can include a sensor, referred to as a "flicker sensor", which can detect variations in ambient illumination. In some examples, the flicker sensor can include a photodetector (e.g., a single-pixel detector) that faces in the same direction as the scene, optionally without any focusing optics. The photodetector can sense periodic changes in the ambient lighting. For example, the flicker sensor can sense a frequency and phase of variations in indoor lighting. In a specific example, indoor lighting can vary in intensity at a wall current frequency, such as 50 Hz or 60 Hz, or a multiple of the wall current frequency caused by electronic ballasts. The flicker sensor can sense the frequency, such as 50 Hz or 60 Hz or an integral multiple of 50 Hz or 60 Hz. The flicker sensor can sense the phase, such as the time at which the indoor lighting has a peak intensity or a minimum intensity. Synchronizing the illumination and/or sensing to the peak intensity of the ambient illumination or the minimum intensity of the ambient illumination can allow the synchronization to occur at a value at which the ambient illumination changes most slowly. Alternatively, the illumination and/or sensing can be synchronized to any suitable phase of the ambient lighting, such as a midpoint between the peak intensity and the minimum intensity.

In some examples, the imaging system can tune a flash PWM frequency and phase to a frequency and phase of ambient lighting, which can help reduce or eliminate banding or partial banding in images captured by the imaging system. In some examples, the phase can be synchronized to a master clock.

In some examples, the PWM can have a programmable phase shift or delay from LED to LED in the LED array. For example, the LEDs can be electrically powered with pulses having a pulse rising edge that is staggered from LED to LED in the LED array. Staggering the rising edges of the PWM pulses in this manner can help reduce or eliminate a current surge that could occur if the LEDs become powered all at the same time.

The imaging system can optionally set the current level, for PWM, differently for different specified illumination levels. For example, the imaging system can have a first PWM current level for a flash mode (e.g., when the illumination includes a burst followed by a duration when the illumination is off) and a second PWM current level, different from the first PWM current level, for a torch mode or video mode (e.g., when the illumination includes a duration when the illumination is continuously on). In some examples, the current level can be varied (such as dynamically, such as in real time, or in discrete durations with a level that varies from duration to duration) as a function of a specified illumination distribution. Such a variable current level can help account for and/or compensate for a decrease in the efficiency of the LEDs with increasing current.

In some examples, segmented LEDs in flash applications can suffer from color shading when using direct current drivers and tuning the current amplitude. In some examples, PWM can help eliminate or reduce the color shading as above but can lead to banding in the picture, especially in mixed lighting conditions. Further, PWM can be inefficient due to droop. Flicker detection can detect ambient illumination variations and can tune the flash frequency and phase to be compatible with the ambient light frequency and phase. In addition, the help the system operate more efficiently, the PWM driver can optionally select a peak current value.

FIG. 1 shows a side view of an example of an illumination system 100, in accordance with some examples.

A segmented light-emitting diode (LED) array 106 (hereinafter referred to as an "LED array") can emit first light 110 from a plurality of light-emitting areas (hereinafter referred to as "LEDs"). An illumination lens 114 can direct the first light 110 toward a scene 104 as illumination 116. A camera 102 can include a camera lens 122 that can collect reflected light 124 that is reflected from and/or emitted by the scene 104. The camera lens 122 can direct the reflect light 124 onto a multi-pixel sensor 126 to form an image of the scene 104 on the multi-pixel sensor 126. A controller 128 can receive a data signal that represents the image of the scene 104. The controller 128 can drive the LEDs 108 in the LED array 106. For example, the controller can optionally control one or more LEDs 108 in the LED array 106 independent of another one or more LEDs 108 in the LED array 106, so as to illuminate the scene 104 in a specified manner. For example, relatively close objects in the scene 104 may require a first amount of illumination, and relatively distant objects in the scene 104 may require a second amount of illumination, greater than the first amount, to have a same brightness in the image of the scene 104. Other configurations are also possible. The camera 102 and illumination system 100 can be disposed in a housing 130. In some examples, the housing 130 can be configured as a smart phone or other suitable device.

In some examples, the camera 102 can function as the flicker sensor. In other examples, a separate flicker sensor can sense the frequency and phase of surrounding illumination, such as in a video image (e.g., a non-static image or a series of static images taken over a duration) of the scene 104.

In some examples, the housing 130 can include an additional ambient light sensor 132 that can function as the flicker sensor. The ambient light sensor 132 can be disposed on or in the housing 130 proximate the camera lens 122 or the illumination lens 114. In some examples, the ambient light sensor 132 can include a single photodetector (e.g., a single-pixel detector or a photodiode). In some examples, the ambient light sensor 132 can lack a lens (e.g., can be a bare detector facing away from the housing 130). The ambient light sensor 132 can sense the frequency and phase of the surrounding illumination 134. In some examples, the ambient light sensor 132 can provide an electrical sensor signal 136 to the controller 128, so that the controller can sense the frequency and phase of the surrounding illumination 134 in response to the electrical sensor signal 136.

Figure 2:
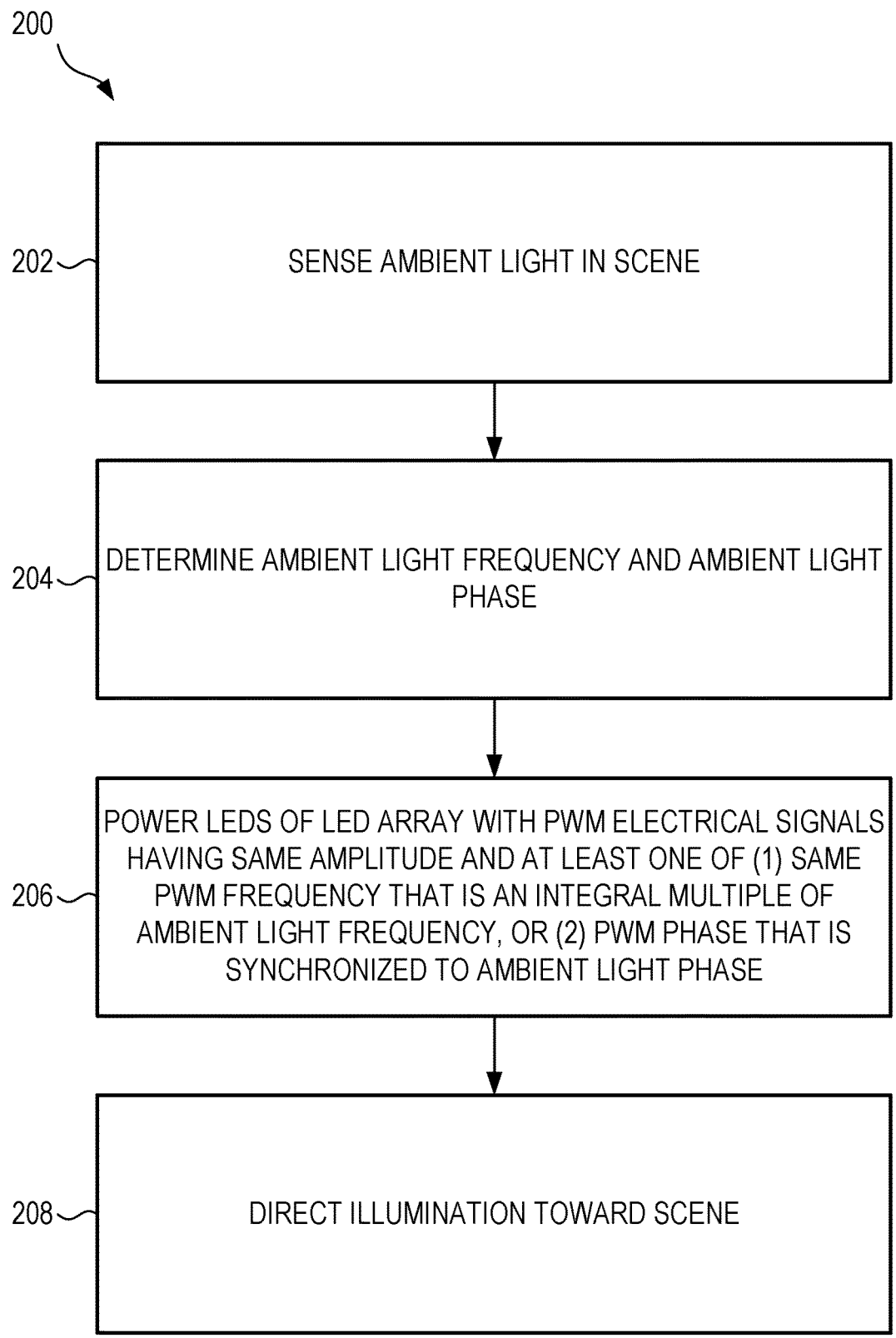
FIG. 2 shows an example of method for illuminating a scene, in accordance with some examples.

FIG. 2 shows an example of method 200 for illuminating a scene, in accordance with some examples.

At operation 202, time-varying ambient light that is present in a scene can be sensed to produce a time-varying ambient light signal.

At operation 204, an ambient light frequency and an ambient light phase of the time-varying ambient light signal can be determined.

At operation 206, LEDs of an LED array can be electrically powered with PWM electrical signals to produce illumination. Each LED of the LED array can illuminate a respective region of the scene. The PWM electrical signals can have a same amplitude. Each PWM electrical signal can have a respective duty cycle that corresponds to a specified illumination intensity in a respective region of the scene. At least one of: the PWM electrical signals can have the same PWM frequency, which is an integral multiple of the ambient light frequency, or each PWM electrical signal can have a respective PWM phase that is synchronized to the ambient light phase.

At operation 208, the illumination can be directed toward the scene to illuminate the scene.

Figure 3:
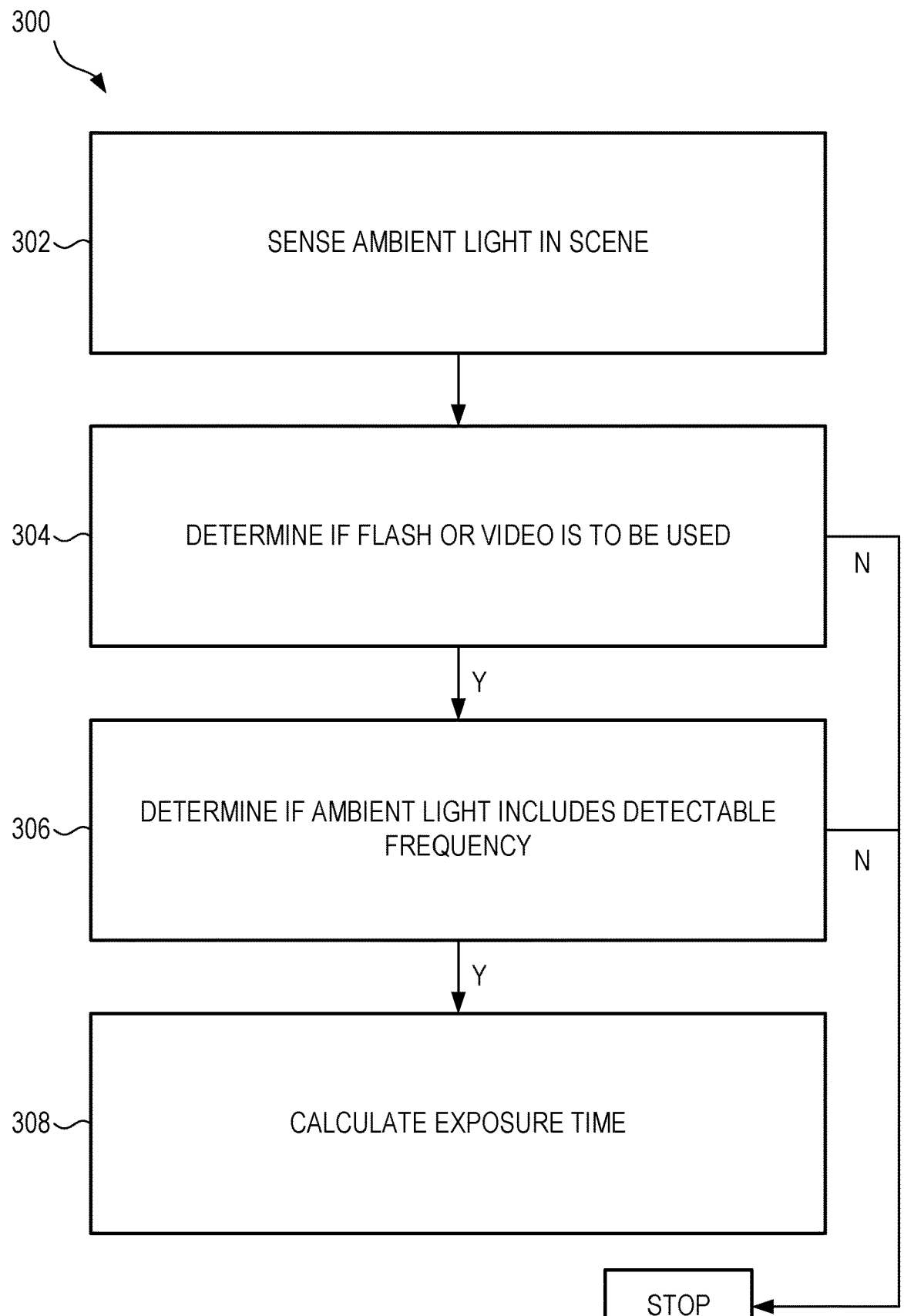
FIG. 3 shows an example of method for selecting a frequency and/or a phase, in accordance with some examples.

FIG. 3 shows an example of method 300 for selecting a frequency and/or a phase, in accordance with some examples.

At operation 302, one or more flicker sensors, such as camera 102 and/or ambient light sensor 132, can sense ambient light at a scene, such as scene 104. For configurations in which an illuminator is configured to illuminate the scene, the illuminator may be unpowered during the ambient light sensing.

At operation 304, one or more processors, such as controller 128, coupled to the camera 102 or ambient light sensor 132, can determine if a flash or a video light is to be used to illuminate the scene. For example, the processor may sense a light level of the ambient light in one or more regions of the scene, compare the light level to a threshold light level, and determine that the flash or video is to be used if the sensed light level is below the threshold light level. If the flash or video light is not to be used, the method 300 can stop. If the flash or video light is to be used, the method 300 can proceed to operation 306.

At operation 306, the processor can determine if the ambient light includes a detectable frequency, such as 60 Hz. If no such detectable frequency is detected, the method 300 can stop. If such a detectable frequency is detected, the method can proceed to operation 308.

At operation 308, the processor can calculate an exposure time. The processor can set a flash or video light to have a PWM frequency that is tuned to the ambient frequency. Alternatively, or in addition, the processor can set a flash or video light to have a PWM frequency that is that is phase-tuned to the ambient phase. Phase tuning in this manner can help reduce or eliminate banding or partial banding in images captured by the imaging system. In some examples, the phase can be synchronized to a master clock.

The method 300 can optionally further include capturing an image or a video of the scene, with the camera 102, using a flash or video light that having a PWM frequency that is tuned to the ambient frequency and/or phase-tuned to the ambient phase. Frequency tuning in this manner can help reduce or eliminate banding or partial banding in images captured by the imaging system.

Figure 4:
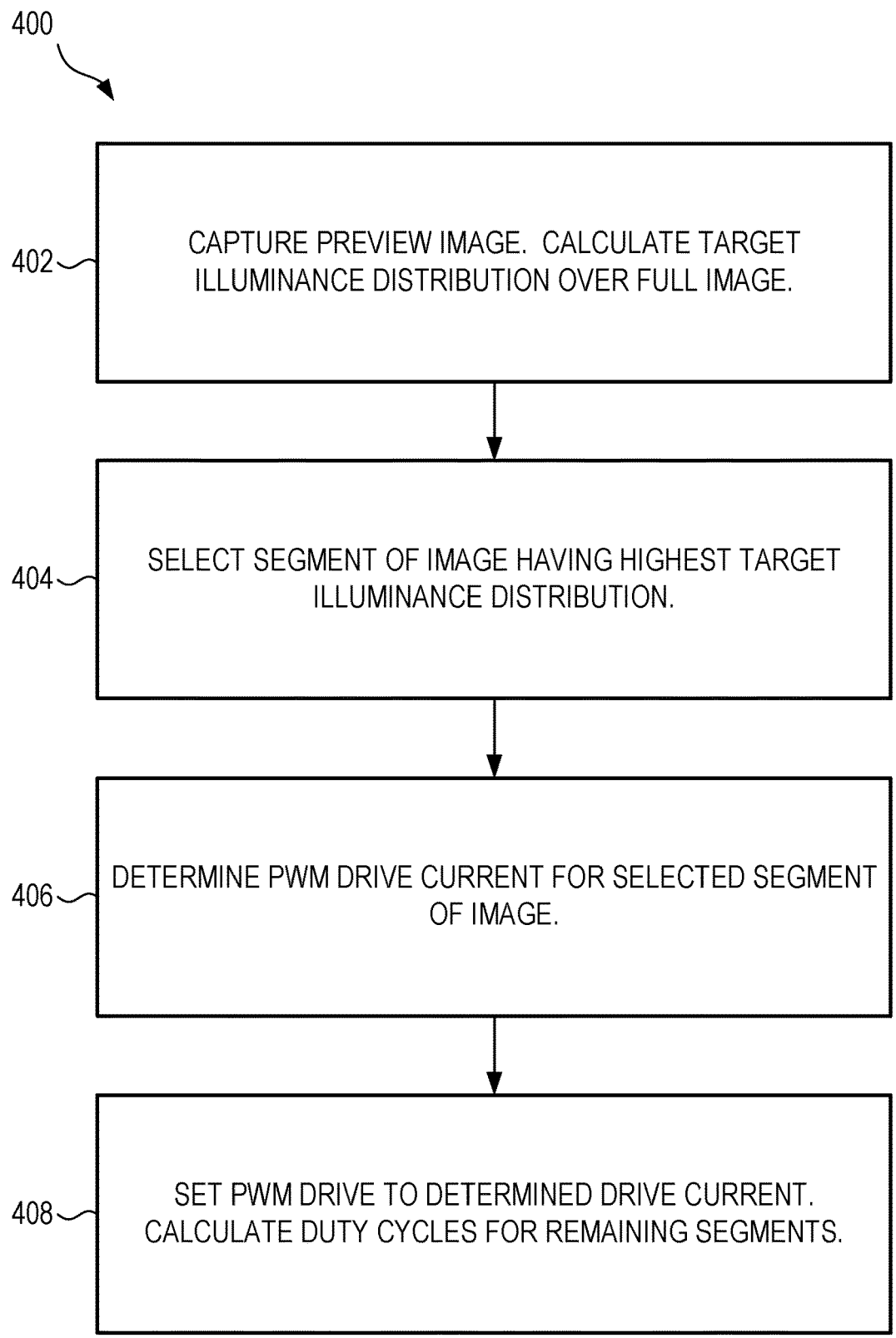
FIG. 4 shows an example of a method for selecting a current for pulse width modulation, in accordance with some examples.

FIG. 4 shows an example of a method 400 for selecting a current for pulse width modulation, in accordance with some examples.

At operation 402, a camera, such as camera 102, can capture a preview image of a scene. A processor, such as controller 128, coupled to the camera, can analyze the preview image. The processor can analyze distances to objects in the scene. The processor can calculate a target illuminance distribution based on the image and the distances to objects in the scene.

At operation 404, the processor can select a segment of the image having the highest requested illuminance, such as a segment having one or more objects that are farthest away from the camera (e.g., are farther away from the camera than objects in other segments of the image) or a first segment having different ambient lighting conditions than a second segment.

At operation 406, the processor can determine a drive current corresponding to the selected segment of the image.

At operation 408, the processor can set a PWM driver to the determined drive current and can calculate duty cycles for the remaining segments depending on the illuminance distribution.

The method 400 can optionally further include capturing an image or a video of the scene, with the camera 102, using a flash or video light that having a PWM current corresponding to the determined drive current, with segments of the image having duty cycles that correspond to the illuminance distribution.

A system for providing illumination can include a segmented LED, a lens, a PWM driver for the LED, flicker detection, and a controller as described herein. Some embodiments may include means to provide illumination as described herein. The processor may contain non-transient instructions that, when executed, cause the processor to perform the operations described herein.

Each picture with flash can be preceded by a preview mode with flicker detection on ambient lighting and a preflash and flash with tuned PWM frequency.

The system and method are applicable to adaptive flash for mobile devices, steerable illumination for automotive/industry applications, and others.

To further illustrate the systems and related methods disclosed herein, a non-limiting list of examples is provided below. Each of the following non-limiting examples can stand on its own or can be combined in any permutation or combination with any one or more of the other examples.

In Example 1, an imaging system can include: a light-emitting diode (LED) array, each LED of the LED array being configured to illuminate a respective region of a scene; an ambient light sensor configured to sense time-varying ambient light that is present in the scene and, in response to the sensed time-varying ambient light, produce a time-varying ambient light signal; a controller configured to: determine an ambient light frequency and an ambient light phase of the time-varying ambient light signal; and electrically power the LEDs of the LED array with respective pulse-width modulation (PWM) electrical signals to produce illumination, the PWM electrical signals having a same amplitude, each PWM electrical signal having a respective duty cycle that corresponds to a specified illumination intensity in a respective region of the scene, the PWM electrical signals having a same PWM frequency that is an integral multiple of the ambient light frequency, and a lens configured to direct the illumination toward the scene to illuminate the scene.

In Example 2, the imaging system of Example 1 can optionally be configured such that each PWM electrical signal has a PWM phase that is offset in time from PWM phases of others of the PWM electrical signals, such that the LEDs of the LED array are electrically powered with PWM electrical signals having pulses with rising edges that occur at different times. Alternatively, the PWM electrical signals can have pulses with falling edges that occur at different times.

In Example 3, the imaging system of any one of Examples 1-2 can optionally be configured such that the PWM electrical signals have PWM phases that are aligned in time with one another, such that the LEDs of the LED array are electrically powered with PWM electrical signals having pulses with rising edges that occur substantially simultaneously. For example, the rising edges can be synchronized to a master clock. Alternatively, the PWM electrical signals can have pulses with falling edges that occur substantially simultaneously.

In Example 4, the imaging system of any one of Examples 1-3 can optionally be configured such that the rising edges of the PWM electrical signals occur at extrema (e.g., maxima and/or minima) of the time-varying ambient light signal. Alternatively, the falling edges of the PWM electrical signals can occur at extrema of the time-varying ambient light signal.

In Example 5, the imaging system of any one of Examples 1-4 can optionally further include a multi-pixel sensor configured to capture an image of the scene while the illumination is directed toward the scene to illuminate the scene. The multi-pixel sensor can have a rolling shutter that is synchronized to the time-varying ambient light signal to capture the image of the scene in a time duration that overlaps with a local extremum (e.g., a local maximum or a local minimum) of the time-varying ambient light signal.

In Example 6, the imaging system of any one of Examples 1-5 can optionally be configured such that the controller is further configured to receive a selection of an image capture mode, the image capture mode including a selection between a static image mode and a video image mode. The static image mode comprises PWM electrical signals having a first amplitude that corresponds to a maximum output of the LEDs. The video image mode comprises PWM electrical signals having a second amplitude that corresponds to a peak efficiency of the LEDs and is different than the first amplitude.

In Example 7, the imaging system of any one of Examples 1-6 can optionally be configured such that the ambient light sensor includes the multi-pixel sensor and a lens configured to form an image of the scene on the multi-pixel sensor.

In Example 8, the imaging system of any one of Examples 1-7 can optionally be configured such that the ambient light sensor includes a photodiode and lacks a lens.

In Example 9, an imaging system can include: a light-emitting diode (LED) array, each LED of the LED array being configured to illuminate a respective region of a scene; an ambient light sensor configured to sense time-varying ambient light that is present in the scene and, in response to the sensed time-varying ambient light, produce a time-varying ambient light signal; a controller configured to: determine an ambient light frequency and an ambient light phase of the time-varying ambient light signal; and electrically power the LEDs of the LED array with respective pulse-width modulation (PWM) electrical signals to produce illumination, the PWM electrical signals having a same amplitude, each PWM electrical signal having a respective duty cycle that corresponds to a specified illumination intensity in a respective region of the scene, each PWM electrical signal having a respective PWM phase that is synchronized to the ambient light phase; and a lens configured to direct the illumination toward the scene to illuminate the scene.

In Example 10, the imaging system of Example 9 can optionally be configured such that each PWM phase is offset in time from the PWM phases of others of the PWM electrical signals, such that the LEDs of the LED array are electrically powered with PWM electrical signals having pulses with rising edges that occur at different times. Alternatively, the PWM electrical signals can have pulses with falling edges that occur at different times.

In Example 11, the imaging system of any one of Examples 9-10 can optionally be configured such that the PWM phases are aligned in time with one another, such that the LEDs of the LED array are electrically powered with PWM electrical signals having pulses with rising edges that occur substantially simultaneously. Alternatively, the falling edges of the PWM electrical signals can occur substantially simultaneously.

In Example 12, the imaging system of any one of Examples 9-11 can optionally be configured such that the rising edges of the PWM electrical signals occur at extrema of the time-varying ambient light signal. Alternatively, the falling edges of the PWM electrical signals can occur at extrema of the time-varying ambient light signal.

In Example 13, the imaging system of any one of Examples 9-12 can optionally further include a multi-pixel sensor configured to capture an image of the scene while the illumination is directed toward the scene to illuminate the scene. The multi-pixel sensor can have a rolling shutter that is synchronized to the time-varying ambient light signal to capture the image of the scene in a time duration that overlaps with a local extremum of the time-varying ambient light signal.

In Example 14, the imaging system of any one of Examples 9-13 can optionally be configured such that the controller is further configured to receive a selection of an image capture mode. The image capture mode can include a selection between a static image mode and a video image mode. The static image mode comprises PWM electrical signals having a first amplitude that corresponds to a maximum output of the LEDs. The video image mode comprises PWM electrical signals having a second amplitude that corresponds to a peak efficiency of the LEDs and is different than the first amplitude.

In Example 15, the imaging system of any one of Examples 9-14 can optionally be configured such that the ambient light sensor includes the multi-pixel sensor and a lens configured to form an image of the scene on the multi-pixel sensor.

In Example 16, the imaging system of any one of Examples 9-15 can optionally be configured such that the ambient light sensor includes a photodiode and lacks a lens.

In Example 17, a method for illuminating a scene can include: sensing time-varying ambient light that is present in a scene to produce a time-varying ambient light signal; determining an ambient light frequency and an ambient light phase of the time-varying ambient light signal; electrically powering light-emitting diodes (LED) of an LED array with pulse-width modulation (PWM) electrical signals to produce illumination, each LED of the LED array being configured to illuminate a respective region of the scene, the PWM electrical signals having a same amplitude, each PWM electrical signal having a respective duty cycle that corresponds to a specified illumination intensity in a respective region of the scene, at least one of: the PWM electrical signals having a same PWM frequency that is an integral multiple of the ambient light frequency, or each PWM electrical signal having a respective PWM phase that is synchronized to the ambient light phase; and directing the illumination toward the scene to illuminate the scene.

In Example 18, the method of Example 17 can optionally be configured such that each PWM phase is offset in time from the PWM phases of others of the PWM electrical signals, such that the LEDs of the LED array are electrically powered with PWM electrical signals having pulses with rising edges that occur at different times. Alternatively, the falling edges of the PWM electrical signals can occur at different times.

In Example 19, the method of any one of Examples 17-18 can optionally be configured such that the PWM phases are aligned in time with one another, such that the LEDs of the LED array are electrically powered with PWM electrical signals having pulses with rising edges that occur substantially simultaneously at maxima or minima of the time-varying ambient light signal. Alternatively, the falling edges of the PWM electrical signals can occur at maxima or minima of the time-varying ambient light signal.

In Example 20, the method of any one of Examples 17-19 can optionally further include: capturing, with a multi-pixel sensor, an image of the scene while the illumination is directed toward the scene to illuminate the scene. The multi-pixel sensor can have a rolling shutter that is synchronized to the time-varying ambient light signal to capture the image of the scene in a time duration that overlaps with a local extremum (e.g., a local maximum or a local minimum) of the time-varying ambient light signal.

In Example 21, an imaging system can include: at least one processor; and non-transitory memory including non-transitory instructions that, when executed by the processor, cause the processor to perform operations, the operations including: sensing time-varying ambient light that is present in a scene to produce a time-varying ambient light signal; determining an ambient light frequency and an ambient light phase of the time-varying ambient light signal; electrically powering light-emitting diodes (LED) of an LED array with pulse-width modulation (PWM) electrical signals to produce illumination, each LED of the LED array being configured to illuminate a respective region of the scene, the PWM electrical signals having a same amplitude, each PWM electrical signal having a respective duty cycle that corresponds to a specified illumination intensity in a respective region of the scene, at least one of: the PWM electrical signals having a same PWM frequency that is an integral multiple of the ambient light frequency, or each PWM electrical signal having a respective PWM phase that is synchronized to the ambient light phase; and directing the illumination toward the scene to illuminate the scene.

In Example 22, the imaging system of Example 21 can optionally be configured to include the limitations of any one of Examples 1-20.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. An imaging system, comprising:
   a light-emitting diode (LED) array, each LED of the LED array being configured to illuminate a respective region of a scene;
   an ambient light sensor configured to sense time-varying ambient light that is present in the scene and, in response to the sensed time-varying ambient light, produce a time-varying ambient light signal;
   a controller configured to:
      determine an ambient light frequency and an ambient light phase of the time-varying ambient light signal; and
      electrically power the LEDs of the LED array with respective pulse-width modulation (PWM) electrical signals to produce illumination, the PWM electrical signals having a same amplitude, each PWM electrical signal having a respective duty cycle that corresponds to a specified illumination intensity in a respective region of the scene, the PWM electrical signals having a same PWM frequency that is an integral multiple of the ambient light frequency; and
   a lens configured to direct the illumination toward the scene to illuminate the scene.

2. The imaging system of claim 1, wherein each PWM electrical signal has a PWM phase that is offset in time from PWM phases of others of the PWM electrical signals, such that the LEDs of the LED array are electrically powered with PWM electrical signals having pulses with rising edges that occur at different times.

3. The imaging system of claim 1, wherein the PWM electrical signals have PWM phases that are aligned in time with one another, such that the LEDs of the LED array are electrically powered with PWM electrical signals having pulses with rising edges that occur substantially simultaneously.

4. The imaging system of claim 3, wherein the rising edges of the PWM electrical signals occur at extrema of the time-varying ambient light signal.

5. The imaging system of claim 1, further comprising a multi-pixel sensor configured to capture an image of the scene while the illumination is directed toward the scene to illuminate the scene, the multi-pixel sensor having a rolling shutter that is synchronized to the time-varying ambient light signal to capture the image of the scene in a time duration that overlaps with a local extremum of the time-varying ambient light signal.

6. The imaging system of claim 5, wherein the controller is further configured to receive a selection of an image capture mode, the image capture mode including a selection between a static image mode and a video image mode, the static image mode comprising PWM electrical signals having a first amplitude that corresponds to a maximum output of the LEDs, the video image mode comprising PWM electrical signals having a second amplitude that corresponds to a peak efficiency of the LEDs and is different than the first amplitude.

7. The imaging system of claim 5, wherein the ambient light sensor includes the multi-pixel sensor and a lens configured to form an image of the scene on the multi-pixel sensor.

8. The imaging system of claim 5, wherein the ambient light sensor includes a photodiode and lacks a lens.

9. An imaging system, comprising:
   a light-emitting diode (LED) array, each LED of the LED array being configured to illuminate a respective region of a scene;
   an ambient light sensor configured to sense time-varying ambient light that is present in the scene and, in response to the sensed time-varying ambient light, produce a time-varying ambient light signal;
   a controller configured to:
      determine an ambient light frequency and an ambient light phase of the time-varying ambient light signal; and
      electrically power the LEDs of the LED array with respective pulse-width modulation (PWM) electrical signals to produce illumination, the PWM electrical signals having a same amplitude, each PWM electrical signal having a respective duty cycle that corresponds to a specified illumination intensity in a respective region of the scene, each PWM electrical signal having a respective PWM phase that is synchronized to the ambient light phase; and
   a lens configured to direct the illumination toward the scene to illuminate the scene.

10. The imaging system of claim 9, wherein each PWM phase is offset in time from the PWM phases of others of the PWM electrical signals, such that the LEDs of the LED array are electrically powered with PWM electrical signals having pulses with rising edges that occur at different times.

11. The imaging system of claim 9, wherein the PWM phases are aligned in time with one another, such that the LEDs of the LED array are electrically powered with PWM electrical signals having pulses with rising edges that occur substantially simultaneously.

12. The imaging system of claim 11, wherein the rising edges of the PWM electrical signals occur at extrema of the time-varying ambient light signal.

13. The imaging system of claim 9, further comprising a multi-pixel sensor configured to capture an image of the scene while the illumination is directed toward the scene to illuminate the scene, the multi-pixel sensor having a rolling shutter that is synchronized to the time-varying ambient light signal to capture the image of the scene in a time duration that overlaps with a local extremum of the time-varying ambient light signal.

14. The imaging system of claim 13, further comprising:
receiving a selection of an image capture mode, the image capture mode including a selection between a static image mode and a video image mode, the static image mode comprising PWM electrical signals having a first amplitude that corresponds to a maximum output of the LEDs, the video image mode comprising PWM electrical signals having a second amplitude that corresponds to a peak efficiency of the LEDs and is different than the first amplitude.

15. The imaging system of claim 13, wherein the ambient light sensor includes the multi-pixel sensor and a lens configured to form an image of the scene on the multi-pixel sensor.

16. The imaging system of claim 13, wherein the ambient light sensor includes a photodiode and lacks a lens.

17. A method for illuminating a scene, the method comprising:
sensing time-varying ambient light that is present in a scene to produce a time-varying ambient light signal;
determining an ambient light frequency and an ambient light phase of the time-varying ambient light signal;
electrically powering light-emitting diodes (LED) of an LED array with pulse-width modulation (PWM) electrical signals to produce illumination, each LED of the LED array being configured to illuminate a respective region of the scene, the PWM electrical signals having a same amplitude, each PWM electrical signal having a respective duty cycle that corresponds to a specified illumination intensity in a respective region of the scene,
at least one of:
the PWM electrical signals having a same PWM frequency that is an integral multiple of the ambient light frequency, or
each PWM electrical signal having a respective PWM phase that is synchronized to the ambient light phase; and
directing the illumination toward the scene to illuminate the scene.

18. The method of claim 17, wherein each PWM phase is offset in time from the PWM phases of others of the PWM electrical signals, such that the LEDs of the LED array are electrically powered with PWM electrical signals having pulses with rising edges that occur at different times.

19. The method of claim 17, wherein the PWM phases are aligned in time with one another, such that the LEDs of the LED array are electrically powered with PWM electrical signals having pulses with rising edges that occur substantially simultaneously at maxima or minima of the time-varying ambient light signal.

20. The method of claim 17, further comprising:
capturing, with a multi-pixel sensor, an image of the scene while the illumination is directed toward the scene to illuminate the scene,
wherein the multi-pixel sensor has a rolling shutter that is synchronized to the time-varying ambient light signal to capture the image of the scene in a time duration that overlaps with a local extremum of the time-varying ambient light signal.

* * * * *